United States Patent
Chien et al.

(10) Patent No.: US 6,668,443 B2
(45) Date of Patent: Dec. 30, 2003

(54) PROCESS FOR MANUFACTURING A SPIN VALVE RECORDING HEAD

(75) Inventors: Chen-Jung Chien, Sunnyvale, CA (US); Chyu-Jiuh Torng, Pleasanton, CA (US); Cherng-Chyi Han, San Jose, CA (US); Moris Dovek, San Jose, CA (US); Po-Kang Wang, San Jose, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 57 days.

(21) Appl. No.: 09/917,347

(22) Filed: Jul. 30, 2001

(65) Prior Publication Data

US 2003/0026047 A1 Feb. 6, 2003

(51) Int. Cl.[7] .......................... G11B 5/127; H04R 31/00
(52) U.S. Cl. ................. 29/603.18; 29/603.15; 204/192.35; 216/22; 306/327.2
(58) Field of Search .......................... 29/603.1, 603.07, 29/603.08, 603.09, 603.11, 603.15, 603.16, 603.17, 603.18; 216/22, 66; 204/192.34; 360/324, 324.1, 324.2, 324.11, 324.12, 327.2

(56) References Cited

U.S. PATENT DOCUMENTS

| | | | |
|---|---|---|---|
| 5,637,235 A * | 6/1997 | Kim et al. .................... 216/22 |
| 5,742,162 A * | 4/1998 | Nepela et al. ............... 324/252 |
| 5,856,897 A | 1/1999 | Mauri ......................... 360/113 |
| 5,959,810 A * | 9/1999 | Kakihara et al. ....... 360/324.12 |
| 6,185,078 B1 | 2/2001 | Lin et al. ................ 360/324.12 |
| 6,201,669 B1 | 3/2001 | Kakihara .................... 360/313 |
| 6,208,491 B1 | 3/2001 | Pinarbasi ................. 360/324.1 |
| 6,208,492 B1 | 3/2001 | Pinarbasi ............... 360/324.11 |
| 6,340,533 B1 * | 1/2002 | Ueno et al. ............ 360/324.11 |
| 6,483,674 B1 * | 11/2002 | Kanai et al. ........... 360/324.12 |
| 6,538,858 B1 * | 3/2003 | Hasegawa et al. ..... 360/324.12 |

* cited by examiner

Primary Examiner—Peter Vo
Assistant Examiner—Donghai Nguyen
(74) Attorney, Agent, or Firm—George O. Saile; Stephen B. Ackerman

(57) ABSTRACT

The possibility of shorting between a spin valve and its underlying magnetic shield layer can be largely eliminated by choosing the bottom spin valve structure. However, doing so causes the hard longitudinal bias that is standard for all such devices to degrade. The present invention overcomes this problem by inserting a thin NiCr, Ni, Fe, or Cr layer between the antiferromagnetic layer and the longitudinal bias layers. This provides a smoother surface for the bias layers to be deposited onto, thereby removing structural distortions to the longitudinal bias layer that would otherwise be present. A process for manufacturing the structure is also described.

10 Claims, 5 Drawing Sheets

PROCESS FOR MANUFACTURING A SPIN VALVE RECORDING HEAD

FIELD OF THE INVENTION

The invention relates to the general field of magnetic disks with particular reference to read heads.

BACKGROUND OF THE INVENTION

The present invention is concerned with the manufacture of the read element in a magnetic disk system. This is a thin slice of material located between two magnetic shields. The principle governing operation of the read sensor is the change of resistivity of certain materials in the presence of a magnetic field (magneto-resistance). In particular, most magnetic materials exhibit anisotropic behavior in that they have a preferred direction along which they are most easily magnetized (known as the easy axis). The magneto-resistance effect manifests itself as a decrease in resistivity when the material is magnetized in a direction perpendicular to the easy axis, said decrease being reduced to zero when magnetization is along the easy axis. Thus, any magnetic field that changes the direction of magnetization in a magneto-resistive material can be detected as a change in resistance.

Magneto-resistance can be significantly increased by means of a structure known as a spin valve (SV). The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are two magnetic layers separated by a non-magnetic layer. The thickness of the non-magnetic layer is chosen so that the magnetic layers are sufficiently far apart for exchange effects to be negligible (the layers do not influence each other's magnetic behavior at the atomic level) but are close enough to be within the mean free path of conduction electrons in the material. If the two magnetic layers are magnetized in opposite directions and a current is passed through them along the direction of magnetization, half the electrons in each layer will be subject to increased scattering while half will be unaffected (to a first approximation). Furthermore, only the unaffected electrons will have mean free paths long enough for them to have a high probability of crossing the non magnetic layer. Once these electrons have crossed the non-magnetic layer, they are immediately subject to increased scattering, thereby becoming unlikely to return to their original side, the overall result being a significant increase in the resistance of the entire structure.

In order to make use of the GMR effect, the direction of magnetization of one the layers must be permanently fixed or pinned. Pinning is achieved by first magnetizing the layer (by depositing and/or annealing it in the presence of a magnetic field) and then permanently maintaining the magnetization by over coating with a layer of antiferromagnetic material. The other layer, by contrast, is a "free layer" whose direction of magnetization can be readily changed by an external field (such as that associated with a bit at the surface of a magnetic disk). Structures in which the pinned layer is at the top are referred to as top spin valves. Similarly, in a bottom spin valve structure the pinned layer is at the bottom.

Although not directly connected to the GMR effect, an important feature of spin valve structures is a pair of longitudinal bias stripes that are permanently magnetized in a direction parallel to the long dimension of the device. Their purpose is to prevent the formation of multiple magnetic domains in the free layer portion of the GMR sensor, particularly near its ends. Thus longitudinal bias is responsible for the stability of a spin-valve recording head. It is usually achieved by an abutted-type junction followed by hard bias and lead deposition.

Referring now to FIG. 1, we show there, in schematic cross-section, a top spin-valve device 11 which is resting on a substrate 14. Longitudinal bias leads 12 contact 11 along its sloping sidewalls 15 and are overlaid with conducting leads 13. To fabricate this device it is necessary to etch through the full thickness of device 11 during the formation of the abutted junction. This is to ensure that there will be enough hard bias material in contact with the free layer which, by definition, is near the bottom of the device.

In FIG. 2 we show a somewhat more detailed view of FIG. 1. Dielectric layer 23 (typically aluminum oxide) rests on magnetic shield layer 24. The spin valve (shown as 11 in FIG. 1) is made up of free layer 21, non-magnetic spacer layer 22, pinned layer 25, and antiferromagnetic (pinning) layer 26. As discussed above, it is necessary to expose as much as possible of free layer 21 if longitudinal bias leads 12 are to be their most effective. Unfortunately, this often results in the removal of a small amount 27 of dielectric layer 23, causing shorting to shield 24 (in areas such as 28) immediately or on life. As read heads grow ever smaller, it becomes necessary to reduce the thickness of dielectric layer 23 as much as possible so this shorting problem can only become worse.

A routine search of the prior art was performed with the following references of interest being found:

In U.S. Pat. No. 5,856,897, Mauri shows stabilization layers under the lead. In U.S. Pat. No. 6,208,491, Pinarbasi shows a SV with a capping structure. U.S. Pat. No. 6,185,078 (Lin et al.), U.S. Pat. No. 6,201,669 (Kakihara), and U.S. Pat. No. 6,208,492 (Pinarbasi) are all related patents.

SUMMARY OF THE INVENTION

It has been an object of the present invention to provide a bottom spin valve structure that is largely free of shorts between said spin valve and an underlying shield.

Another object has been that said spin valve structure include a buffer seed layer that prevents structural distortion which causes longitudinal hard bias to degrade.

A further object has been that said structure have optimal performance for a range of different antiferromagnetic materials.

A still further object has been to provide a process for manufacturing the structure.

Yet another object has been that said process result in better control of the junction etch process.

An additional object has been that said process provide for a smoother interface which ensures that magnetization will be mostly in the plane of the free layer.

These objects have been achieved by inserting a thin NiCr layer between the anti-ferromagnetic layer and the longitudinal bias layers. This provides a smoother surface for the bias layers to be deposited onto, thereby removing distortions to the longitudinal bias field that would otherwise be present.

DESCRIPTION OF THE PREFERRED EMBODIMENTS

Figure 3:
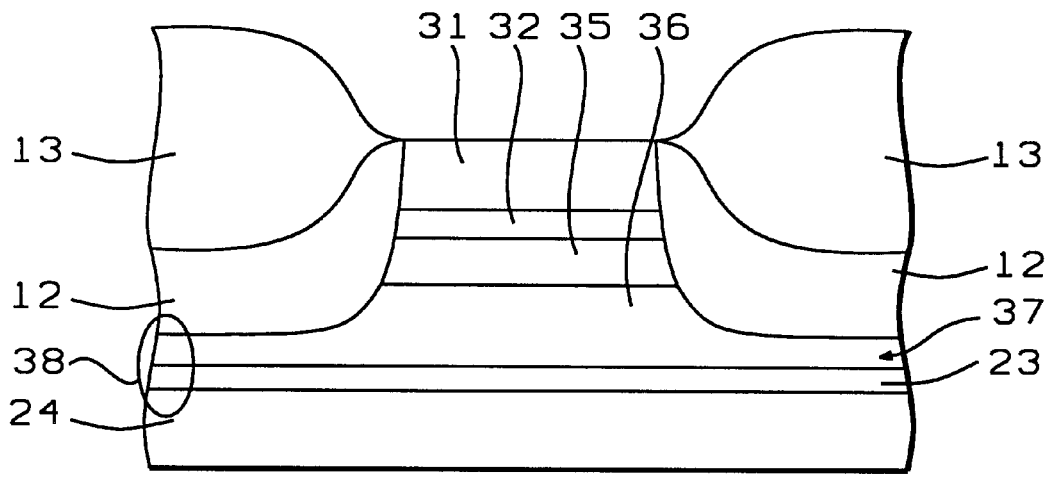
FIG. 3 shows how the shorting problem illustrated in FIG. 2 can be overcome by using a bottom spin valve.

One solution to the shorting problem that was discussed earlier is to use a bottom spin valve, an example of which is shown in FIG. 3. In this structure, free layer 31 lies on top of spacer 32 below which are pinned layer 35 and antiferromagnetic layer 36. With this configuration, etching can be terminated well away from dielectric layer 23 thereby leaving a substantial thickness 37 of antiferromagnetic material between hard bias layer 12 and layer 23. This effectively solves the problem of possible shorting in areas such as 38.

Figure 4:
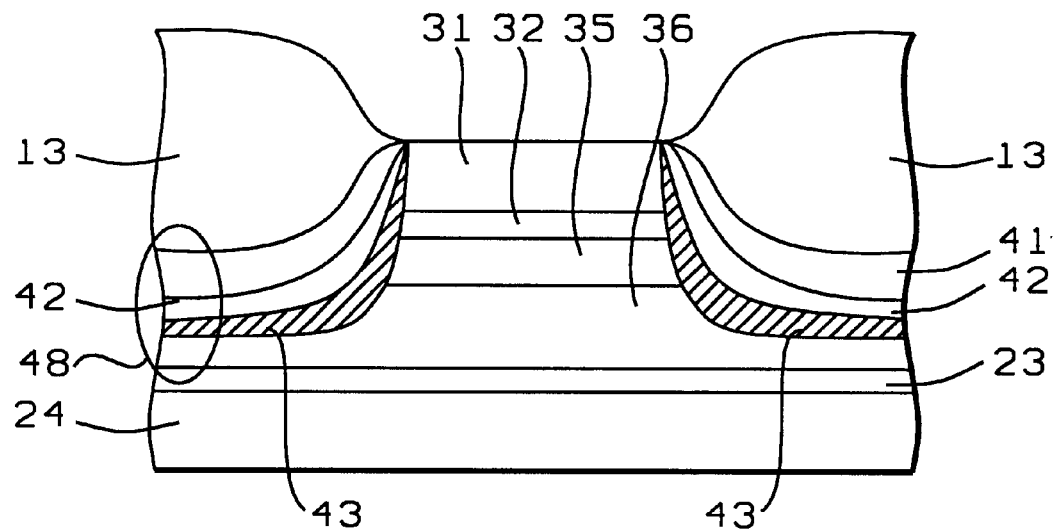
FIG. 4 shows how the structure of FIG. 3 can result in a distortion of the longitudinal biasing field.
Figure 5:
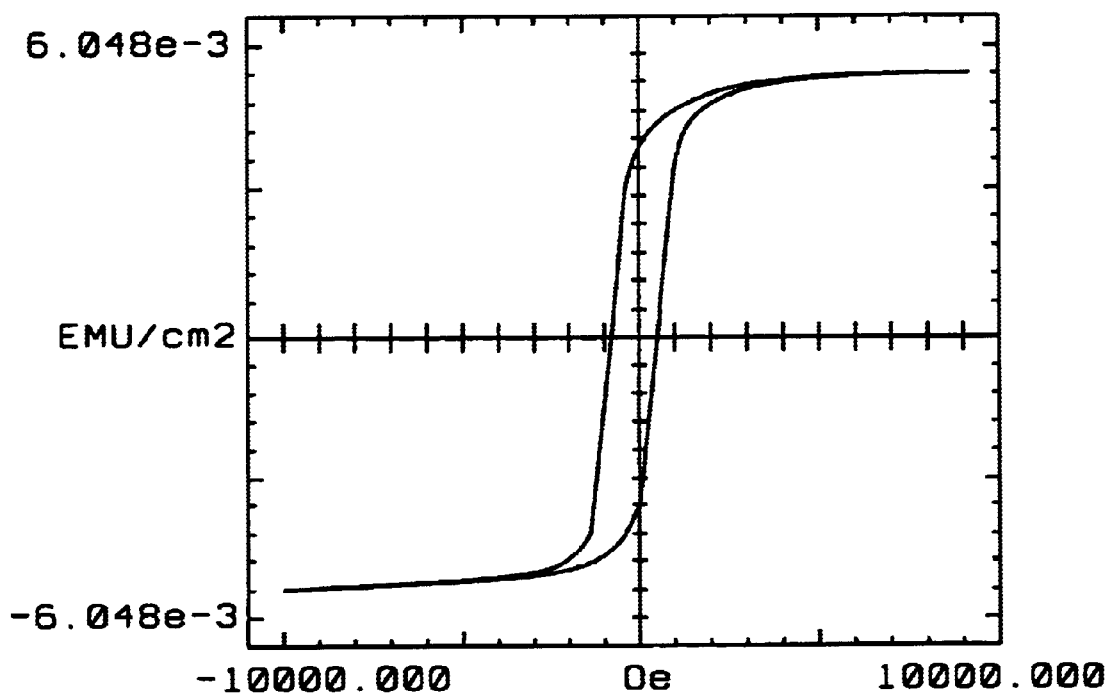
FIG. 5 is a hysteresis loop obtained from a structure such as that seen in FIG. 4.

However, this approach introduces a drawback of its own namely that the presence of an antiferromagnetic layer (typically MnPt) directly beneath the hard bias layer dramatically affects the latter's properties. FIG. 4 shows more detail for the bias layer itself. Seen there is bias layer 41 (typically CoCrPt, CoPt, or CoCrTa) and a seed layer 42/43 which is typically a laminate of two materials such as CrTi/Ta, Cr/Ta, or WTi/Ta). The less than optimum magnetic properties of the structure seen in FIG. 4 are reflected in the poor squareness (SQ) and coercivity (Hc) that are obtained when a plot of magnetization vs. applied magnetic field is made (as shown in FIG. 5).

Investigation of the problem revealed that it was the result of lattice distortion in the seed layer caused by its contact with the antiferromagnetic layer. To solve this problem (without introducing yet another new problem) we have modified the structure in the manner illustrated in FIG. 6. Thin NiCr, Ni, Fe, or Cr film 66 is inserted between the seed layer 43 and the antiferromagnetic layer 36. This screens out structural distortion arising from the long junction tail of a bottom spin valve. Since the NiCr, Ni, Fe, or Cr is non-magnetic, hard bias properties are not affected but device stability and yield are significantly improved. The NiCr is effective because it serves to smooth out the surface onto which the longitudinal bias structure is deposited. Therefore the present invention may be applied to other antiferromagnetic materials besides the MnPt which we have favored.

Figure 6:
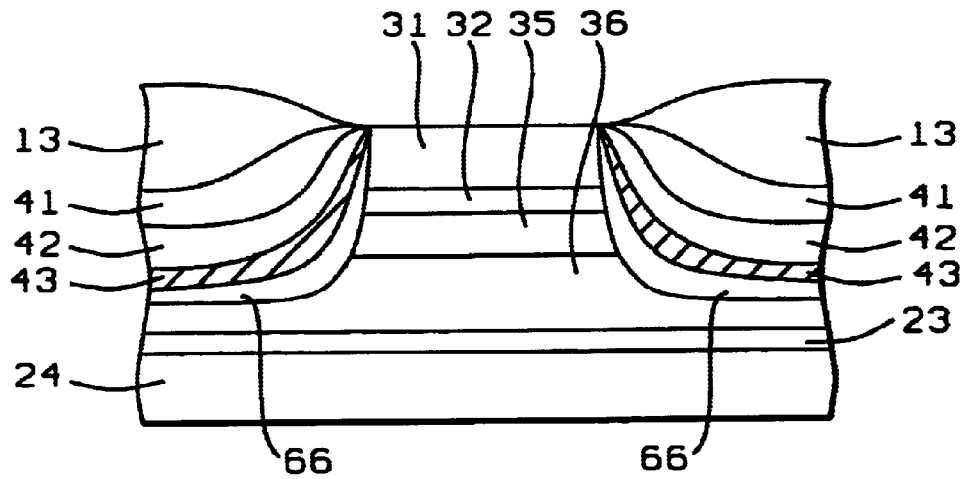
FIG. 6 shows how, as taught by the present invention, the structure of FIG. 4 can be modified to eliminate said magnetic distortion.

To manufacture the structure of FIG. 6, the following process was used:

Following the provision of magnetic shield layer 24, dielectric layer 23 was deposited thereon to a thickness between about 100 and 400 Angstroms, with about 250 Angstroms being preferred. This was followed by the deposition of 40–70 Å of NiCr and antiferromagnetic layer 36 to a thickness between about 50 and 300 Angstroms, with about 150 Angstroms being preferred.

Figure 1:
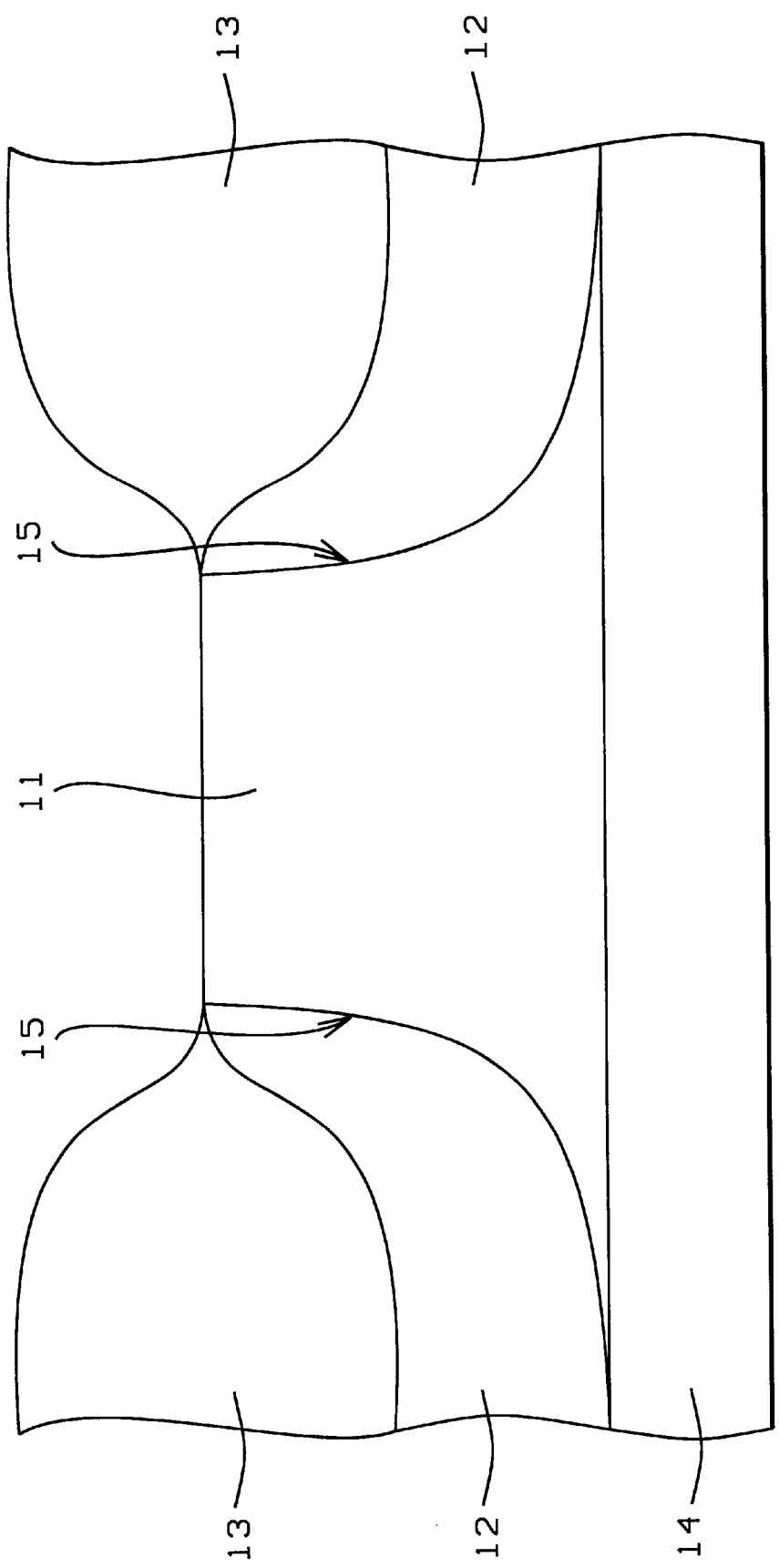
FIG. 1 shows a GMR SV pedestal with longitudinal bias and conducting leads.
Figure 2:
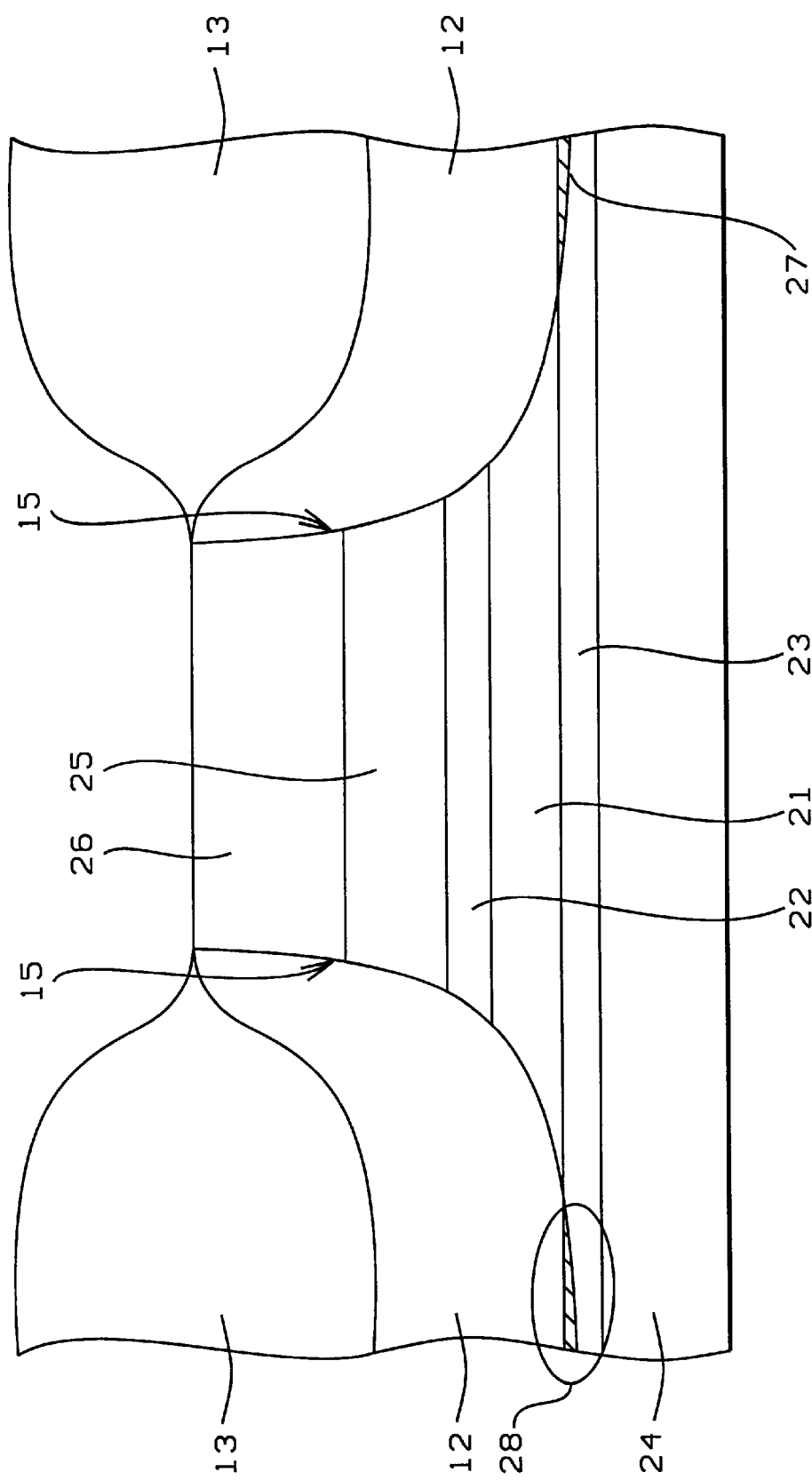
FIG. 2 shows a top spin valve indicating where possible shorts through the dielectric layer substrate to an underlying magnetic shield can occur.

Then, in succession, pinned layer 35, non-magnetic spacer layer 32, and free layer 31 were deposited, resulting in the formation of a bottom spin valve stack. An etch mask (not shown) to define a pedestal was then formed on free layer 31 and used for etching out the pedestal (such as 11 in FIG. 1). Etching was done with a moderately directional ion beam. This resulted in some shadowing by the photoresist so that the pedestal that formed had sloping walls such as 15 in FIG. 1.

An important feature of the invention is that the etching process was terminated at the point where about half the thickness of the (unmasked portion of the) antiferromagnetic layer 36 had been etched away.

Next, as a key feature of the invention, layer of NiCr, Ni, Fe, or Cr 66 was deposited on the pedestal. Deposition of layer 66 was achieved by ion beam sputtering. The thickness of this nickel chromium layer is between about 10 and 100 Angstroms, with about 50 Angstroms being preferred. This thickness is sufficient to enable presentation of a smooth surface to the next layer but is thin enough to have minimal effect on any magnetic field emanating from the next layer. Layer 66 contained between about 55 and 65 atomic % of nickel (when NiCr was used).

Hard bias seed layers 42 and 43 are then deposited onto nickel-chromium layer 66. Layers 42 and 43 form a laminate of tantalum under Cr, CrTi, or WTi. This is followed by the deposition of longitudinal hard bias layer 41 which is any of CoCrPt, CoPt, or CoCrTa, with CoCrPt being preferred. Layer 41 is deposited to a thickness between about 100 and 500 Angstroms, with about 350 Angstroms being preferred.

The process concludes with the deposition of conductive lead layer 13 using a liftoff process (not shown) to keep layer 13 off the top surface of free layer 31.

Results

Figure 7:
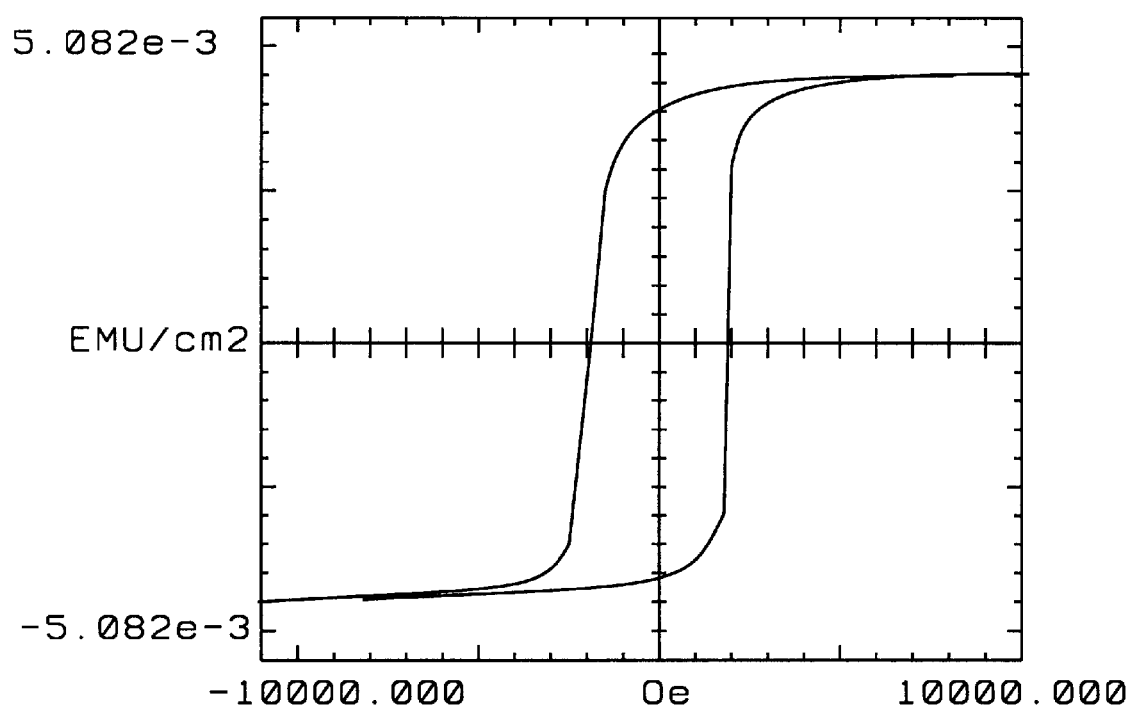
FIG. 7 is a hysteresis loop obtained from the structure illustrated in FIG. 6.

In FIG. 7 we show the magnetization vs. applied field curve for the structure of FIG. 6. Differences between the magnetic properties of our earlier structures (such as that seen in FIG. 4) and those of our later structures (such as that seen in FIG. 6) are summarized in TABLE I below:

TABLE I

| PROPERTY | STRUCTURE OF FIG. 4 | STRUCTURE OF FIG. 6 |
| --- | --- | --- |
| Hysteretic squareness | 0.676 | 0.917 |
| Switching field dist. | 0.407 | 0.146 |
| Coercivity | 830.0 | 1,886.3 |

Discussion

For hard magnetic thin films to be used in a GMR head, three fundamental magnetic properties are required in order to prevent Barkhausen noise in the read-back signal (due to domain movement, as mentioned above). First, to ensure that a stable reproducing characteristic is maintained even when an external magnetic field is applied, the hard magnetic thin film must have large coercive force. Second, the in-plane remnance moment should be large enough, since this is the component of the hard magnetic thin film that provides the longitudinal bias flux. Third, as already noted earlier, the hysteresis loop should be as square as possible. As can be seen, the structure of the present invention exhibits an improvement, relative to our earlier structures, on all counts. Although it is not directly relevant in this invention, we note that switching field distribution is the spread of applied field that would switch magnetization from +25% to −25% and is a measure of the squareness of the M–H curve. A lower value is good since it indicates a more square, and therefore more stable, hysteresis loop.

What is claimed is:

1. A process for manufacturing a spin valve recording head, comprising:

providing a dielectric layer on a magnetic shield;

on said dielectric layer, depositing an antiferromagnetic layer;

in succession, depositing on said antiferromagnetic layer a pinned layer, a non-magnetic spacer layer, and a free layer, thereby forming a bottom spin valve stack;

on the free layer, forming an etch mask that defines a pedestal;

using said mask, etching the stack and under-cutting said mask until all unprotected parts of said free layer, spacer layer and pinned layer and about one half of said antiferromagnetic layer have been removed, thereby forming the pedestal, said pedestal having outwardly sloping sidewalls that extend from the free layer to the unremoved portion of the antiferromagnetic layer;

on the sidewalls, depositing a non-magnetic surface smoothing layer that is between about 10 and 100 Angstroms thick on said smoothing layer, depositing a hard bias seed layer;

on said hard bias seed layer, depositing a longitudinal hard bias layer; and on the longitudinal hard bias layer, depositing a conductive lead layer.

2. The process described in claim 1 wherein said smoothing layer is selected from the group consisting of NiCr, Ni, and Fe.

3. The process described in claim 2 wherein said NiCr layer contains between about 55 and 65 atomic percent of nickel.

4. The process described in claim 1 wherein said antiferromagnetic layer is selected from the group consisting of MnPt, MnPdPt, IrMn, and NiMn.

5. The process described in claim 1 wherein the antiferromagnetic layer is deposited to a thickness between about 100 and 300 Angstroms.

6. The process described in claim 1 wherein said longitudinal hard bias layer is selected from the group consisting of CoCrPt, CoPt, and CoCrTa.

7. The process described in claim 1 wherein said longitudinal hard bias layer is deposited to a thickness between about 100 and 500 Angstroms.

8. The process described in claim 1 wherein the step of depositing the hard bias seed layer further comprises depositing a laminate of tantalum and a metal selected from the group consisting of Cr, CrTi, and WTi.

9. The process described in claim 1 wherein said hard bias seed layer is deposited to a thickness between about 10 and 100 Angstroms.

10. The process described in claim 1 wherein the dielectric layer is deposited to a thickness between about 150 and 400 Angstroms.

* * * * *